(12) United States Patent
Goettler et al.

(10) Patent No.: US 8,496,253 B2
(45) Date of Patent: Jul. 30, 2013

(54) METALLIC FLAT GASKET

(75) Inventors: Andreas Goettler, Ulm (DE); Guenther Unseld, Neenstetten (DE); Oliver Schimmele, Pfaffenhofen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 656 days.

(21) Appl. No.: 12/451,026

(22) PCT Filed: Apr. 24, 2008

(86) PCT No.: PCT/EP2008/003327
§ 371 (c)(1),
(2), (4) Date: Jan. 8, 2010

(87) PCT Pub. No.: WO2008/128785
PCT Pub. Date: Oct. 30, 2008

(65) Prior Publication Data
US 2010/0109256 A1   May 6, 2010

(30) Foreign Application Priority Data

Apr. 24, 2007   (EP) ..................... 07008321
May 31, 2007   (EP) ..................... 07010816

(51) Int. Cl.
*F16J 15/08* (2006.01)
(52) U.S. Cl.
USPC ........................... 277/594; 277/593; 277/601
(58) Field of Classification Search
USPC .................. 277/592–594, 600, 601
See application file for complete search history.

(56) References Cited

U.S. PATENT DOCUMENTS

| | | | | |
|---|---|---|---|---|
| 2,134,868 A | * | 11/1938 | Fitzgerald | 277/599 |
| 3,499,655 A | * | 3/1970 | Kapps et al. | 277/600 |
| 3,794,333 A | * | 2/1974 | Czernik et al. | 277/593 |
| 4,272,085 A | * | 6/1981 | Fujikawa et al. | 277/594 |
| 4,312,512 A | * | 1/1982 | Conte et al. | 277/593 |
| 4,535,996 A | * | 8/1985 | Cardis et al. | 277/313 |

(Continued)

FOREIGN PATENT DOCUMENTS

| | | |
|---|---|---|
| DE | 2 118 610 A1 | 10/1972 |
| DE | 29804534 U1 * | 5/1998 |

(Continued)

*Primary Examiner* — Gilbert Lee
(74) *Attorney, Agent, or Firm* — Marshall & Melhorn, LLC

(57) ABSTRACT

The invention relates to a metallic flat gasket comprising a gasket layer (2) having at least one combustion chamber through-opening (3) which is surrounded by an elastically deformable sealing element (4) which is configured in the form of an undulatory profiling (40) in the gasket layer (2) in such a way that on each of the surfaces (21, 22) of the gasket layer (2) at least two wave crests (41) and two wave troughs (42) are present. The thickness (hyl) of the gasket layer (2) in the region of the sealing element (4), in the unloaded state, is greater than the original thickness (alpha) of the gasket layer. Apart from the undulatory profiling (40), no further sealing or support elements are present around the combustion chamber through-opening (3). The sealing element has, when subjected to linear compression of from 500 to 2,800 N/mm in a direction which is substantially perpendicular to the plane (E) of the gasket layer, a thickness which is greater by from 0.05 to 0.3 mm than the original thickness (d) of the gasket layer which has at least 4 through-openings for fastening means (51) and also at least one further through-opening (5) for lubricant or coolant that is surrounded by an elastomer sealing element (6), the combustion chamber through-opening (3) having a diameter of less than 200 mm.

27 Claims, 8 Drawing Sheets

U.S. PATENT DOCUMENTS

| | | | | |
|---|---|---|---|---|
| 4,620,710 A * | 11/1986 | Lambert et al. | ............... | 277/596 |
| 4,655,463 A * | 4/1987 | Inciong et al. | ............... | 277/593 |
| 5,439,234 A * | 8/1995 | Udagawa | ...................... | 277/595 |
| 5,516,124 A * | 5/1996 | Kubouchi et al. | ............. | 277/595 |
| 5,785,322 A * | 7/1998 | Suggs et al. | ............. | 277/615 |
| 5,890,719 A | 4/1999 | Bettencourt | | |
| 6,062,572 A * | 5/2000 | Hasegawa et al. | ............ | 277/592 |
| 6,814,357 B2 * | 11/2004 | Diez et al. | ................... | 277/593 |
| 7,000,924 B2 * | 2/2006 | Hohe et al. | ................... | 277/593 |
| 7,204,491 B2 * | 4/2007 | Hatamura et al. | ............ | 277/593 |
| 7,287,757 B2 * | 10/2007 | Chen et al. | ................... | 277/593 |
| 7,527,269 B2 | 5/2009 | Tiefenbach et al. | | |
| 2001/0024019 A1* | 9/2001 | Watanabe et al. | ............ | 277/594 |
| 2003/0230858 A1* | 12/2003 | Matsuki et al. | .............. | 277/594 |
| 2004/0188952 A1* | 9/2004 | Flemming | ..................... | 277/592 |
| 2005/0023768 A1* | 2/2005 | Adams et al. | ................. | 277/592 |
| 2005/0140096 A1* | 6/2005 | Golombek et al. | ............ | 277/594 |
| 2005/0206091 A1 | 9/2005 | Detmann et al. | | |
| 2005/0269788 A1* | 12/2005 | Grunfeld | ....................... | 277/592 |
| 2006/0131818 A1* | 6/2006 | Diez et al. | ..................... | 277/592 |
| 2006/0175763 A1 | 8/2006 | Duckek et al. | | |
| 2007/0013145 A1 | 1/2007 | Detmann et al. | | |
| 2007/0210532 A1 | 9/2007 | Hegmann | | |
| 2009/0224486 A1 | 9/2009 | Tiefenbach et al. | | |
| 2011/0042904 A1* | 2/2011 | Clemons et al. | ............. | 277/594 |

FOREIGN PATENT DOCUMENTS

| | | | |
|---|---|---|---|
| DE | 19829058 A1 * | 1/2000 | |
| DE | 20 2006 003 678 U1 | 6/2006 | |
| EP | 358855 A * | 3/1990 | |
| EP | 0 499 551 A1 | 8/1992 | |
| EP | 1 674 770 A1 | 6/2006 | |
| EP | 1 577 589 B1 | 8/2007 | |
| EP | 1 635 093 B1 | 11/2008 | |
| EP | 1 679 457 B3 | 7/2009 | |
| GB | 2097871 A * | 11/1982 | |
| JP | 61192547 A | 8/1986 | |
| JP | 61255253 A | 11/1986 | |
| JP | 64-6349 U | 1/1989 | |
| JP | 08-233106 | 9/1996 | |
| JP | 2000-027999 | 1/2000 | |
| JP | 2002502945 A | 1/2002 | |
| JP | 2002161804 A | 6/2002 | |
| JP | 2004503731 A | 2/2004 | |
| WO | WO 95/22020 A1 | 8/1995 | |
| WO | WO 2004/076893 A1 | 9/2004 | |
| WO | 2005080834 A1 | 9/2005 | |

* cited by examiner $h_{VL} - h_b = D_{VL} - D_b$
$\Delta_{VL} = h_{VL} - d$
$\Delta_b = h_b - d$
$\quad = \Delta_{VL} - (D_{VL} - D_b)$

METALLIC FLAT GASKET

BACKGROUND OF THE INVENTION

The invention relates to a metallic flat gasket which is suitable, in particular, as a cylinder head gasket for utility vehicles. In cylinder head gaskets, the sealing of the combustion chamber openings, in exhaust manifold gaskets of the combustion gas openings, is particularly important. In order to ensure a reliable seal in this region, it is therefore necessary, in particular in applications such as are conventionally encountered in commercial vehicle diesel engines with or without cylinder liners, to concentrate the screwing force on the combustion chamber with which the cylinder head and motor block are joined together. In order to achieve this, it is conventional in cylinder head gaskets for internal combustion engines having a small or no liner projection to provide a so-called protrusion at the edge of the combustion chamber. This means that, in the region around the combustion chamber openings, the overall thickness of the gasket layers of the cylinder head gasket, including a small liner projection or setoff which may be present, is greater than the overall thickness of the gasket layers in regions of the gasket that are more remote from the combustion chamber openings, i.e., the so-called "hinterland".

A protrusion of this type at the edge of the combustion chamber is frequently achieved using what is known as a stopper. These stoppers are usually solid annular inlays extending directly along the edge of the combustion chamber. The stoppers are generally of a height such that they, in combination with the thickness of the gasket layers present in the region around the combustion chamber opening, completely fill the sealing gap between the motor block and cylinder head in the region around the combustion chamber opening. As an alternative to inserting a separate ring, the stopper can also be produced by bending an edge portion of the gasket layer at the combustion chamber opening. Stoppers of this type have no elastic properties. In order to achieve reliable sealing of the combustion chamber openings, stoppers are therefore conventionally used in combination with an elastic sealing element, generally a bead, which conventionally extends, viewed from the combustion chamber opening, radially outside the stopper. Generally, the stopper serves at the same time also as a support element for the bead and prevents complete flattening thereof during operation of the gasket. The attachment of a stopper radially behind the bead, as an alternative or in addition to the stopper at the edge of the combustion chamber, is also known in the art. Furthermore, there are solutions in which an elastic bead is combined with a separate rigid element in such a way that both are at a comparable radial distance from the edge of the combustion chamber.

The construction of the stopper-bead gaskets is comparatively complex. In addition, it is often necessary, in order to obtain reliable sealing of the combustion chamber openings, to topographically configure the region of the cylinder head gasket around the combustion chamber openings. Without such a topographical configuration, the clamping pressure/force exerted by the fastening means in the circumferential direction around the combustion chamber openings would often be non-uniform. A plurality of screws are conventionally distributed around the combustion chamber opening for fastening the cylinder head to the motor block. In the built-in state, the distance between the cylinder head and cylinder block is usually greater in the region between the screws than on the screws themselves. As a result, the size of the sealing gap to be filled by the cylinder head gasket which is arranged between the motor block and cylinder head gasket increases. This sealing gap variance is allowed for by an appropriate topography of the cylinder head gasket around the combustion chamber openings. It is for example known to configure the height of the stopper in the circumferential direction around the combustion chamber opening in accordance with the size of the sealing gap. The manufacture of such a topography in solid stoppers is however often complex and difficult.

An alternative solution for the sealing of combustion chamber openings in cylinder head gaskets for utility vehicle engines consists in using, instead of a stopper-bead combination, a purely plastic bead at the edge of the combustion chamber. This purely plastic bead, which can also be a multiple bead extending in a plurality of concentric rings around the combustion chamber opening, has, in contrast to the beads of the stopper-bead gaskets, almost no elastic properties. However, this lack of elasticity often leads to unsatisfactory sealing properties around the combustion chamber openings. In order to obtain the required rigidity, the plastic beads are in addition frequently provided with what is known as a hard coating or the bead cavity is filled with a rigidifying material. This complicates and increases the cost of the manufacture of a gasket of this type.

There was therefore a need for a metallic flat gasket and in particular a cylinder head gasket for internal combustion engines that leads, while maintaining a simple construction, to reliable sealing of the through-openings and in particular of the combustion chamber openings in the case of cylinder head gaskets. The object of the invention is accordingly to devise a metallic flat gasket of this type.

This object is achieved by the metallic flat gasket according to claim 1. Preferred embodiments of this flat gasket are described in the sub-claims.

BRIEF SUMMARY OF THE INVENTION

The invention accordingly relates to a metallic flat gasket comprising at least one gasket layer having at least one through-opening which is surrounded by an elastically deformable sealing element. The sealing element is configured in the form of an undulatory profiling in the gasket layer in such a way that on each of the surfaces of the gasket layer at least two respective wave crests and two wave troughs are present. In individual cases it may occur that only 1½ wave periods enclose the through-opening all the way round. The thickness of the gasket layer in the region of the sealing element in the unloaded state is greater than the original thickness of the gasket layer. Apart from this undulatory profiling, no further sealing or support elements for the through-opening are present in the flat gasket. The sealing element, i.e. the undulatory profiling, is configured in such a way that a difference in thickness between the original thickness of the gasket layer and the thickness in the region of the sealing element remains even if the sealing element is exposed to loading in a direction which is substantially perpendicular to the plane of the gasket layer. Specifically, in the installed state, the thickness of the gasket layer in the region of the sealing element is greater by from 0.05 to 0.3 mm, preferably from 0.05 to 0.2 mm, than the original thickness of the gasket layer. The term "substantially perpendicularly" means that the action of force deviates from the perpendicular by no more than 2° and in particular no more than 1°.

A configuration of this type of the sealing element around the through-opening means that the sealing element has both elastic and rigid properties. The rigid properties are in this case adjusted in such a way that even in the event of the screwing force provided acting in the region of the sealing element, a protrusion, which is maintained throughout the operation of the gasket, is formed at the edge of the combustion chamber. This permanent protrusion in the region of the through-opening allows the screwing forces to be concentrated in this region and the necessary high clamping pressure to be ensured in this region. The undulatory profiling as the sealing element can in this way assume the function of a solid stopper. However, at the same time, the undulatory profiling also has elastic properties. These elastic properties allow the undulatory profiling, as the sealing element of the through-opening, elastically to follow changes in the sealing gap, for example of from 5 to 15 µm, during the operation of the gasket and thus, in this case too, to ensure outstanding tightness around the through-opening. Owing to the high elasticity of the sealing element, it is even possible to reduce the screwing forces to a minimum without compromising the tightness as a result.

The invention combines in the specifically configured sealing element the functions of an elastic element (for example a bead) and a (rigid) stopper of a conventional gasket in a single element. This allows the construction and manufacture to be greatly simplified compared to the conventional gaskets. In addition, the selection of the number of wave crests and wave troughs allows the rigidity to be adapted to the necessary requirements. According to the invention, the undulatory profiling is configured in such a way that on each of the surfaces of the gasket layer at least two wave crests and two wave troughs are present. Therefore, for each surface, at least two compression lines extending around the through-opening are present. Preferably, more than two wave crests and two wave troughs per surface of the gasket layer are introduced therein, thus forming a correspondingly higher number of annular compression lines around the opening. The large number of these compression lines ensures sufficient tightness in the region around the through-opening.

The configuration of the undulatory profiling can be varied in a broad range of ways as required in each case. Normally, the course of the wave crests and wave troughs around the through-opening will follow the course of the outer contour of the through-opening. In the case of a circular opening, for example, the wave crests and wave troughs can therefore extend in concentric circular rings around the through-opening. Other outline shapes, such as for example oval, polyhedral or other uniform or non-uniform course shapes, are however also conceivable. For reasons of space, wave crests and wave troughs preferably extend along concentric lines, although this is not absolutely necessary either.

The cross section of the wave crests and wave troughs of the undulatory profiling in a section in the radial direction can in principle also be configured in any desired manner. Preferred shapes have a sinusoidal, trapezoidal or zigzag-shaped cross-sectional profile. Modifications of these shapes, for example with flanks rising at differing degrees of steepness, flattened peaks, etc. are however also conceivable. The cross-sectional shape can be the same for all wave crests and wave troughs or differ for individual wave crests and/or wave troughs. It is also possible to vary the cross-sectional shape in the course of a single wave crest or wave trough.

The undulatory profiling, as the sealing element of the through-opening, is accordingly ideal for generating a topography in the region around the through-opening. In this way, the sealing properties can be purposefully adapted to the conditions encountered in each case. The variation of the properties, such as for example the height and/or rigidity of the undulatory profiling, can be varied both in the radial and in the circumferential direction or in both directions. Preferably, this adaptation is carried out by varying at least one of the following properties: the height of the wave crests, the cross-sectional shape of the wave crests and/or the wave troughs, the distance between adjacent wave crests and the material thickness in the region of the wave crests and/or wave troughs. See, for example, FIG. 18. On variation of the height of the wave crests it is also possible for the height of a wave crest to be reduced in the circumferential direction to zero in certain regions, i.e. for it to disappear, as it were, in certain portions in the gasket layer. The change in height within the topography is preferably up to 0.03 mm and is in any case carried out in such a way that the protrusion at the edge of the through-opening is in the claimed range of from 0.05 to 0.3 mm. A greater height of the wave crests, more steeply rising flanks of the wave crests and the wave troughs, a shorter distance between adjacent wave crests and a greater material thickness lead in this case to increased rigidity of the undulatory profiling.

In order to ensure the required permanent protrusion at the edge of the combustion chamber, the sealing element in the form of the undulatory profiling has not only elastic, but rather also plastic properties. The elasticity of the undulatory profiling is therefore lower than the elasticity of conventional beads. This is also apparent from the fact that the dimensions of the undulatory profiling are smaller than the dimensions of a conventional bead or multiple bead. The distance between the peak points of adjacent wave crests of the undulatory profiling is thus expediently in a range of up to 2.0, preferably up to 1.7, particularly preferably up to 1.5, in particular up to 1.0 mm. If the wave crests do not have any peak point, but rather a flattened peak region, the distance between the center points of these peak regions is measured, in all cases in a plane which is parallel to the plane of the gasket layer. If the height of a wave crest is reduced in the circumferential direction to zero, the distance between the adjacent wave crests is obviously measured in the regions in which the wave crest has a height greater than zero. If the distance between adjacent wave crests in the circumferential direction varies relative to one another, all of these distances expediently lie in the specified range.

The undulatory profiling as the sealing element is configured in the gasket layer itself. This means that the undulatory profiling is generated not in a separate part, but rather integrally and in one piece in the gasket layer. There is therefore no need for inlay rings such as are usually used in conventional stoppers. This simplifies and reduces the cost of manufacturing the gasket considerably. The undulatory profiling is generated in such a way that there are configured in the direction of both surfaces of the gasket layer wave crests and wave troughs which do not have to be symmetrical. The thickness of the gasket layer in the region of the undulatory profiling is therefore greater than the original thickness of the gasket layer, i.e. the thickness of the gasket layer prior to the introduction of the wave crests and wave troughs. The thickness of the gasket layer in the region of the undulatory profiling is in this case measured as the distance between two tangential planes which are each positioned parallel to the plane of the gasket layer on the respectively highest wave crest which protrudes beyond one and the other side of the gasket layer.

The protrusion of the profiled region is according to the invention, in the installed state, at least 0.05 mm. In the cold state, the screwing forces acting on the gasket are per screw from 50-220 kN, preferably from 60-200 kN and particularly preferably from 100-200 kN or, expressed as linear compression, from 500-2,800 N/mm, preferably from 800-2,500 N/mm, particularly preferably from 800-1,500 N/mm. The linear compression relates in this case to the average peripheral length of the undulatory profiling. The average peripheral length is the extent in the circumferential direction around the combustion chamber opening in the middle (at half-width) of the profiling. In the laboratory the height of the profiled region is determined in such a way that this region is loaded with a force substantially perpendicularly. The term "substantially perpendicularly" means that the action of screwing force deviates from the perpendicular by no more than 2° and in particular no more than 1°. The protrusion is, under initial load conditions, i.e. under the minimum pressure necessary for reproducible measurements, 2.4 N/mm$^2$, from 0.05 to 0.35 mm, preferably from 0.07 to 0.32 mm. On simulation of the above-mentioned action of force in the installation state, the permanent protrusion of the undulatory profiling is from 0.05 to 0.3 mm, preferably from 0.05 to 0.2 mm.

Preferably, the undulatory profiling is generated by embossing. In principle, a wave crest on one surface of the gasket layer corresponds to a wave trough on the other surface and vice versa. A topography can thus be generated by embossing the profiling into the gasket layer. Other manufacturing processes such as, for example, deep-drawing, hydroforming or knurling are however also conceivable.

In order to achieve both the required elastic and the required rigid properties of the undulatory profiling, a relatively thick metal sheet is expediently used for the gasket layer. Thicknesses in the range of from 0.2 to 1.5 mm are preferred, metal sheet thicknesses of from 0.3 to 1.0 mm being preferred for multilayer gaskets and of from 0.8 to 1.2 mm for single-layer gaskets. Within the provided thickness ranges, one may use 0.3 to 0.6 mm. In addition, the metal should have a relatively high tensile strength which is preferably at least 600 N/mm.sup.2 and in particular at least 1,000 N/mm.sup.2. Steel is a preferred material for the gasket layer. The invention allows the use of relatively inexpensive steels such as, for example, conventional carbon steels or cold-rolled carbon steels (for example C590, C75). If more pronounced elastic properties are required, spring steel can also be used. Suitable steels include for example high-grade steels, in particular those of type numbers 1.4310, 1.4372, 1.4301 or 1.4303. Suitable selection of the material itself, of the material thickness and therefore the nature of the configuration of the undulatory profiling allows the rigidity of the sealing element to be purposefully adapted to the specific application. The various possibilities for configuring the undulatory profiling have been referred to hereinbefore. If cold-rolled steel is used, tapering the flanks, for example, i.e. reducing the material thickness in the region of the flanks of the wave crests and wave troughs, allows more marked rigidification to be set. In contrast to the plastically deformable beads of the prior art, in the case of the invention it is not necessary to fill the wave troughs with a material such as, for example, elastomer in order to increase the rigidity of the beads. The use of such filler materials or what are known as hard coatings for the region of the undulatory profiling is not preferred within the context of the invention. The rigidity of the undulatory profiling is set exclusively by the selection of the material and shaping of the profiling itself.

As mentioned hereinbefore, the undulatory profiling is incorporated into the gasket layer and not inserted into or welded onto the gasket layer as a separately produced ring. However, this does not necessarily mean that the gasket layer as a whole must be in one piece. Especially in the case of very extensive gaskets, it may be preferable for the gasket layer in which the undulatory profiling is generated to be composed of a plurality of segments. However, a segment containing the through-opening with the undulatory profiling comprises at least one region extending outwardly from the through-opening and containing at least some of the fastening means openings surrounding the through-opening. The segment does not in this case have to reach the outer edge of the gasket. If the gasket layer is divided into a plurality of segments, the segments are preferably configured as uniformly as possible. It is in this way possible to construct in a modular design, for example, gaskets of differing sizes by placing the segments alongside one another. A procedure of this type is advantageous, in particular, in cylinder head gaskets. In this case the gasket layer can for example be divided transversely to the longitudinal sides, thus producing segments containing one or two cylinder openings. Placing segments comprising two cylinder openings alongside one another allows, for example, gasket layers to be constructed in this way for 4-cylinder engines, 6-cylinder engines, etc. Alternatively or additionally, it is possible to insert in the so-called "hinterland" of the gasket layer, i.e. in a region outside the through-openings surrounded by the undulatory profiling, so-called inserts into openings in the gasket layer. The region of the undulatory profiling itself is however, as mentioned hereinbefore, not configured as an insert.

The metallic flat gasket according to the invention will usually have more than just a single through-opening. For example, a plurality of through-openings surrounded by an undulatory profiling can be present. In addition, the gasket layer can have other types of through-openings which will be referred to hereinafter as further through-openings. If the metallic flat gasket is a cylinder head gasket, the through-openings surrounded by the undulatory profiling are expediently the combustion chamber openings. The further through-openings can be openings for cooling water and oil and also screw openings. If these further through-openings likewise have to be surrounded by sealing elements, the sealing elements used for this purpose are frequently not undulatory profilings but rather other elastically deformable sealing elements such as, for example, beads or elastomer lips.

In addition, the metallic flat gasket according to the invention can have more than just one gasket layer. In principle, it is in this case conceivable to use further gasket layers having an undulatory profiling as the sealing element of a through-opening, although this is not preferred. The further gasket layers used are, instead, one or more gasket layers which differ in type from the gasket layer with undulatory profiling. The further gasket layers are, for example, metallic gasket layers which are substantially free from stopper elements or other support elements. In a preferred embodiment, the at least one further gasket layer is completely planar. The further gasket layers may be spacer and/or cover layers. Additionally or alternatively to these further gasket layers, other gasket layers having functional elements can be present. The functional elements may, for example, be elastic sealing elements, in particular beads, stopper elements or other support elements which are introduced into the gasket layer. The functional elements are however in this case located not in those regions opposing the undulatory profiling, nor do they individually enclose any of the combustion chamber openings surrounded by the undulatory profilings, i.e. they do not act as sealing elements therefor. In principle, there may be any desired number of further gasket layers. It is however preferable for the flat gasket according to the invention to contain just one or at most two further gasket layers. These gasket layers will be referred to hereinafter as cover layers, as they are preferably arranged on one or both surfaces of the gasket layer provided with the undulatory profiling. The surface area of the further gasket layers can correspond to that of the gasket layer having the undulatory profiling or differ therefrom. The cover layers can also be segmented. It is in this case possible for, in one gasket, only the cover layers or both the cover layers and the layer in which the undulatory profiling is configured to be segmented. In the latter case, mutually adjacent layers are preferably segmented at differing locations. The through-openings present in the gasket layer having the undulatory profiling are accordingly likewise present in the further gasket layers. The through-openings thus frequently do not end exactly flush with one another. This is on the one hand due to punching tolerances during production; on the other hand, joining the various layers may also require the provision of a small but noticeable difference in size.

Preferably, the at least one cover layer is arranged on the surface of the gasket layer in such a way that it covers the region of the undulatory profiling. Preferably, the cover layer is planar in this region. This has the advantage firstly that the at least one cover layer provides a planar and smooth bearing surface for the undulatory profiling. Also, the cover layer prevents the peak regions of the wave crests from being able to intrude into the opposing surfaces to be sealed.

If the gasket is multilayered in its configuration, the gasket layers are joined together using processes from the prior art, i.e. welding, in particular laser-welding, clinching, riveting, bonding, screwing, clawing.

The region of the covering metal sheets, which is not opposing the further through-openings in the gasket layer provided with an undulatory profiling, can be configured in different ways. One possibility consists, for example, in providing the sealing element for the at least one further through-opening in the covering metal sheet. For example, a bead can be embossed into the covering metal sheet, which for this purpose is made preferably of spring steel, in the region around the further through-opening. In a further embodiment, the further through-opening is surrounded by an elastomer sealing element which is present in the gasket layer. In this case the covering metal sheet expediently has a recess in the region of this further through-opening. The dimensions of the recess are in this case such that the elastomer sealing element is also received in the recess of the covering metal sheet. The height of the elastomer application is in this case expediently selected in such a way that the height of the elastomer sealing element protrudes outward beyond the surface of the covering metal sheet. For example, the height of the elastomer sealing element is approximately 25% greater than the distance from the surface of the gasket layer, to which the elastomer sealing element is applied, to the outer surface of the covering metal sheet, measured in the installation state of the metallic flat gasket. In this configuration the covering metal sheet can serve as a compression protection means for the elastomer sealing element of the further through-opening and prevent the elastomer element from being subjected to excessive compression if the pressure is too high. The distance between the elastomer element and the edge of the recess of the covering metal sheet in this case sufficiently great that both parts do not get into contact even during operation of the gasket, although the desired compression protection is nevertheless achieved. Preferably, in the unfitted state, a distance of approximately 0.5 mm is kept.

The at least one covering metal sheet can be cut out, at least in certain portions or else completely, also in the regions opposing the outer edge region of the profiled gasket layer. Such a reduction of the extent of the at least one covering metal sheet compared to the profiled gasket layer can, for example, be beneficial if the profiled gasket layer has an elastomer sealing lip encircling part or all of the outer edge region as an edge seal. Preferred are outer edge seals encircling at least along 80%, preferably 90%, particularly preferably 100% of the total outer edge of the profiled gasket layer. The outer edge seal is preferably likewise made of an elastomer. As described hereinbefore with reference to the sealing of further through-openings inside the gasket layer, the at least one covering metal sheet can serve in this case too as a compression protection means for the outer edge sealing lip. With regard to the height of the sealing lip and distance from the edge of the covering metal sheet, that which was stated previously concerning the elastomer sealing elements inside the gasket layer applies.

There may however also be cases in which the covering metal sheet cannot be brought sufficiently close to the outer edge sealing lip in order still to ensure compression protection. This may for example be the case if there are through-openings sealed by elastomer sealing elements in the vicinity of the outer edge sealing lip, in the region of which through-openings the covering metal sheet must likewise be cut out. In such cases, compression protection of the outer edge sealing lip can be ensured by providing local support elements in proximity thereto. These local support elements are spatially highly restricted thickenings of the profiled gasket layer. Such thickening can be achieved by the local application of material to the gasket layer. This can be carried out, for example, using a flange portion or by the welding-on/bonding-on of a separate element. A preferred manner for generating a local support element is the insertion of a sleeve into the gasket layer. This sleeve is introduced into a through-opening in the gasket layer and protrudes on both sides beyond the surfaces thereof. Falling-out of the sleeve can be prevented, for example, by raising the outer edges. Other fastening processes include welding, clamping, bonding or connection via the elastomer. It is particularly preferable for the support sleeve to be inserted into a through-opening which is already present in the gasket layer. The size of the diameter of the through-opening is increased as appropriate for this purpose. Particularly suitable as a through-opening for inserting a support sleeve is a screw opening. The size, number, height and position of the support elements are determined by the position, shape and extent of the outer edge sealing lip. Preferably, the height of the sealing element corresponds to the original total thickness of the metal sheet.

It is also possible to cut out the covering metal sheet in the "hinterland", including in particular in regions close to the outer edge, and to compensate for the thus reduced total thickness of the gasket in the respective regions by means of embossments extending—apart from a region of transition to the edge of the cut out cover layer and optional regions in which elastomer sealing elements are placed including their respective transition region—over the entire cut out surface in the layer containing the undulatory profiling. The embossments consist in this case of alternating elevations and depressions extending on at least one set of virtual parallel lines. A plurality of sets of virtual parallel lines can in this case intersect in the regions in which the embossment is itself present, so the structuring differs from the simple basic linear shape. The virtual parallel lines continue however beyond the actual embossed region, so sets of virtual parallel lines intersecting outside the embossed region yield regions which are separated from one another and have differingly oriented linear structuring.

The outer edge sealing lip can be arranged, either on one side or on both sides, on the surfaces of the gasket layer having the undulatory profiling. It can extend directly at the outer edge of the gasket layer or at a distance therefrom. A preferred embodiment consists in arranging the outer edge sealing lip at the outer edge rim of the gasket layer so that it projects outward and beyond both surfaces of the gasket layer.

The outer edge sealing lip is—like the remaining elastomer sealing elements—preferably pointed. The materials used can be any elastomers previously used for this purpose in metallic flat gaskets and in particular cylinder head gaskets, i.e. both natural and synthetic elastomers. Suitable examples include TPE (thermoplastic elastomers), fluoropolymers, for example FPM (vinylidene fluoride-hexafluoropropylene copolymer), PFA, MFA, NBR rubber (acrylate-butadiene rubber), HNBR (hydrated acrylate-butadiene rubber), EPDM (ethylene-propylene rubber), silicone rubber, ACM (polyacrylate), EAM (ethylene acrylate) or else PU (polyurethane). The elastomers preferably have a hardness of at least 35 Shore A. The elastomer sealing elements can also be used in the conventional manner to seal not just one through-opening but rather a plurality of through-openings at once. Appropriately extensive cut out portions are in this case present in the at least one covering metal sheet.

Furthermore, the elastomer can also be guided through the region in which two through-openings, each surrounded by an undulatory profiling, are adjacent to one another. The application of the elastomer in the web region between adjacent openings is preferably integrated as a portion into an elastomer sealing element which seals one or more through-openings. In the web region, as mentioned hereinbefore, the gasket layer is preferably also divided into a plurality of segments. The region of separation between adjacent segments extends in this case outside the surface area taken up by the elastomer. In the region of separation between two adjacent segments, the covering metal sheet is in this case preferably configured in such a way that it still covers the border region in which the segments abut. Such covering of the border regions of adjacent segments by the covering metal sheets is preferred even if no elastomer sealing elements extend in the web region between adjacent through-openings surrounded by undulatory profilings.

The invention is in principle suitable for a broad range of types of metallic flat gaskets, for example exhaust gas manifold gaskets. The invention is particularly suitable however for cylinder head gaskets and in this case mainly for gaskets for utility vehicle engines. Such gaskets can be configured with or without cylinder liners. The invention is however particularly suitable for use in internal combustion engines without cylinder liners or with cylinder liners 100 having a liner projection or setoff 102 of at most 0.15 mm, in particular in utility vehicle engines, as shown in FIG. 19. On account of their high ignition pressure of at least 140 bar, preferably at least 160 bar and particularly preferably at least 180 bar, these internal combustion engines place particular demands on the sealing capacity of the cylinder head gaskets.

The gaskets in which the undulatory profiling is preferably configured are distinguished by an extension of their surface of at most 1,500 mm in the longitudinal direction and 500 mm in the transverse direction, the combustion chambers engines for commercial vehicles having a diameter from at least 80 to of up to 200 mm and the webs, which are present in multiple-cylinder gaskets, between the combustion chambers having a width of more than 4 mm. The gaskets have, in addition to the at least one combustion chamber through-opening, at least 4 through-openings for fastening means and also at least one lubricant and/or coolant through-opening.

The metallic flat gasket according to the invention can be manufactured using previously known processes and conventional tools. Apart from the above-described differences, the conventional starting materials can be used. Other conventional components, not described hereinbefore, of metallic flat gaskets can, unless ruled out by the crucial configuration of the gasket, also be used. Thus, the flat gasket according to the invention can for example have, in the "hinterland" of the gasket, support elements which are intended to counteract distortions in the opposing surfaces to be sealed. Reference should be made in this regard, in particular, to what are known as the "hinterland stoppers" which are attached, in particular, to the narrow sides of cylinder head gaskets and/or in the region of the screw openings. Such stoppers can likewise be used within the context of the invention. It is particularly expedient if the "hinterland stoppers" are for example likewise in the form of an undulatory profiling. They can then be generated in the same operation as the undulatory profiling(s) around the through-opening. The undulatory profiling can in this case have an exclusively linear form or curve, for example, at the corners of the gasket. It is also possible, as in the case of the thickenings, for the undulatory profiling to extend on a plurality of sets of virtual straight lines, wherein the sets intersect, thus producing more complex profiling, in particular if the sets intersect within the profiling. They can however also consist of meandering, chessboard-like or truncated pyramid-shaped profilings. In addition, individual gasket layers or all of the gasket layers can be provided wholly or in part, on one or both sides with a coating. All previously conventional materials can be used in this case too.

BRIEF DESCRIPTION OF THE DRAWINGS

The invention will be described hereinafter with reference to the drawings. These drawings merely illustrate, purely by way of example, certain preferred configurations of the invention, without the invention being restricted to the described examples. In the drawings.

DETAILED DESCRIPTION OF THE INVENTION

Figure 1:
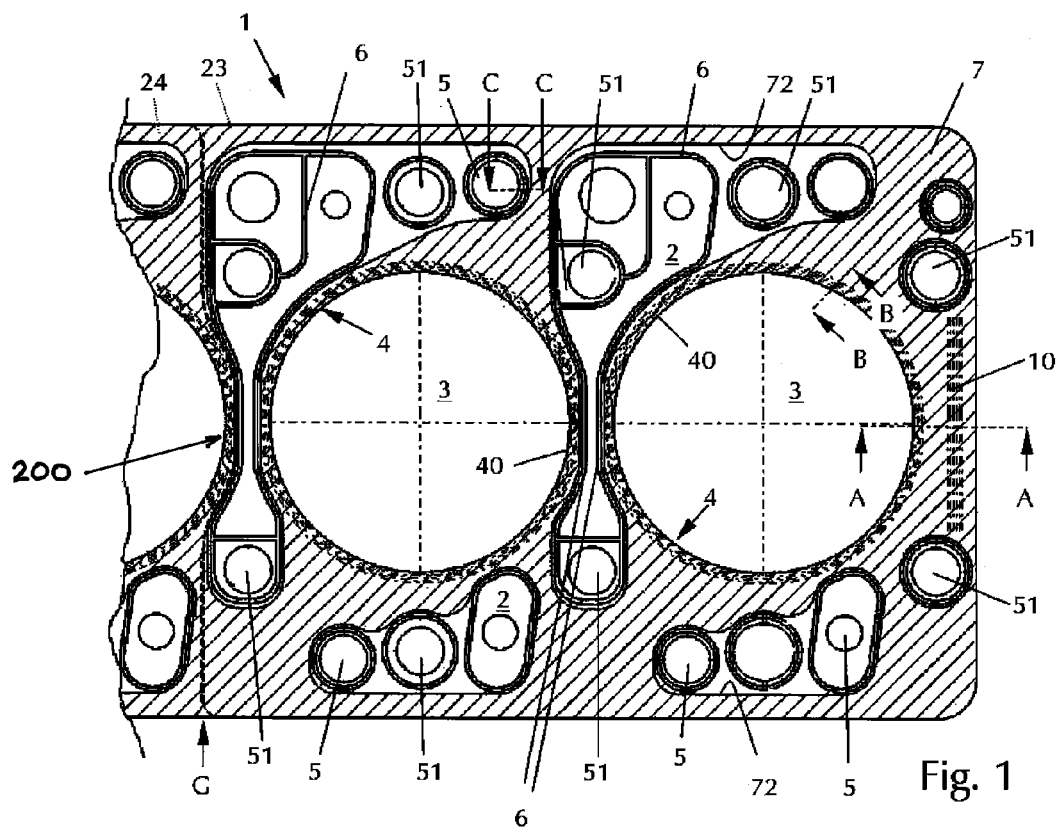
FIG. 1 is a schematic partial plan view onto a metallic flat gasket based on the example of a cylinder head gasket.

FIG. 1 is a partial plan view onto a metallic flat gasket 1 based on the example of a cylinder head gasket. As may be seen from FIGS. 2 to 4 and FIG. 17, the gasket is a three-layer gasket comprising a gasket layer 2 and also two cover layers 7 and 7' which are arranged on both surfaces 21 and 22 of the gasket layer 2. The cylinder head gasket 1 has a plurality of combustion chamber openings 3, of which only two can be seen in full in FIG. 1. Also present in the outer region of the gasket and cover layers are a large number of further through-openings 5 which are openings for oil, cooling water and screw openings, said screw openings being denoted by reference numeral 51.

The combustion chamber openings 3 are each surrounded by a sealing element 4 which is in the form of an undulatory profiling 40 in which wave crests 41 alternate with wave troughs 42. Four respective wave crests 41 are present on each of the surfaces 21 and 22 of the gasket layer 2. The peak points 43 of the wave crests are set apart from one another by a distance a which is in a range of up to 2.0, preferably up to 1.7, particularly preferably up to 1.5 and especially preferably up to 1.0 mm. The undulatory profiling 40 is generated by embossing of the respective edge region of the gasket layer 2 around the through-opening 3. This provides an increase in thickness compared to the original thickness d of the gasket layer 2 in the region of the undulatory profiling 40.

FIGS. 3(a) and 3(b) illustrate this increase in thickness, on the one hand, in the non-fitted state of the gasket, wherein for the purposes of measurement an initial load (force) of 2.4 N/mm² acts substantially perpendicularly on the gasket (FIG. 3(a)) and also in the case of the fitted gasket which is loaded with a force equivalent to the screwing force (FIG. 3(b)). With regard to FIG. 3(a), it should be noted that a reproducible height measurement is not possible in the completely unloaded state. The difference in thickness $\Delta_{VL}$ results from the difference in height h, in the region of the undulatory profiling 40 and the original thickness d of the gasket layer 2. The undulatory profiling 40 is according to the invention configured in such a way that on the one hand it has elastic properties but on the other hand leads, when acted on by a force corresponding at least to the loading to be expected during operation of the gasket, to a permanent protrusion at the edge of the combustion chamber. This permanent protrusion is ascertained as a result of the fact that the cylinder head gasket 1 is acted on in the region of the undulatory profiling 40 initially with a force of 2.4 N/mm². This force (denoted in the present case by VL) acts on the gasket substantially perpendicularly to the plane of the gasket layer 2. The term "substantially perpendicularly" means in the present document that the action of force deviates from the perpendicular by no more than 2° and in particular no more than 1°.

The resulting protrusion in the installed state $\Delta_b$ is determined by applying a force F, which is equivalent to the screwing force, to the region of the undulatory profiling and measuring the corresponding deformation in the perpendicular direction. There is thus determined what is known as the characteristic curve which specifies the thickness $h_b$ of the undulatorily profiled region as a function of the applied force F. Whereas the initial load VL is conventionally generated by pressing with a punch from above perpendicularly onto the region of the undulatory profiling, the force F for determining the characteristic curve is applied by means of a flange. The protrusion $\Delta_b$ on the combustion chamber under installation conditions results from the difference in height $h_b$ between the undulatory profiling under the action of force and the original thickness of the profiled layer, d. This difference is according to the invention in a range of from 0.05 to 0.3 mm, preferably from 0.05 to 0.2 mm. The sealing element 4 thus not only ensures during operation of the cylinder head gasket 1 elastic sealing of the combustion chamber opening 3, but rather at the same time also ensures a protrusion along the combustion chamber opening 3, which causes the screws, which are guided through the fastening means openings 51 and with which the cylinder head gasket 1 is clamped between the motor block and cylinder head, to exert a clamping pressure which is concentrated substantially in the region around the combustion chamber openings 3. The undulatory profilings 40 therefore combine the functions of an elastic bead and a stopper and ensure, by means of an elastic deformation and the remaining protrusion, which is present at the same time, excellent tightness which can be improved still further by generating a topography in the circumferential direction around the combustion chamber openings 3.

The further through-openings 5 in the "hinterland" of the gasket, i.e. openings for oil and cooling liquid, are sealed in the case shown by sealing elements 6 consisting of elastomer sealing lips. These sealing lips 6 are configured to be sufficiently tall to protrude beyond the outer surfaces 73 and 73' of the covering metal sheets 7 and 7'. This may be seen in FIG. 4 which shows a cross section along the line C-C in FIG. 1. In the region of the elastomer sealing elements 6, the covering metal sheets 7 and 7' have recesses 72 which are sufficiently large to both incorporate the further through-openings 5 and to receive the sealing elements 6 thereof. The elastomer lips 6 have in this case a width of at least 0.5 mm. The covering metal sheets 7 and 7' serve in this case as deformation limiters for the sealing elements 6 and prevent the elastomer from being able to be compressed further than up to the height of the covering metal sheets 7 and 7'. In regions in which a plurality of through-openings 5 are located close to one another and/or surrounded by a common sealing element 6, a common recess 72 is present in the covering metal sheets 7, 7'.

Further recesses in the covering metal sheets 7, 7' are also located in the region between adjacent through-openings 3 and also the adjoining screw openings 51. In this case, not only do the elastomer sealing elements 6 surround the through-openings 5 in the "hinterland" of the gasket, they also extend in the examples shown via the web region 200 (see FIG. 1) between adjacent through-openings 3 with their sealing elements 4.

Figure 2:
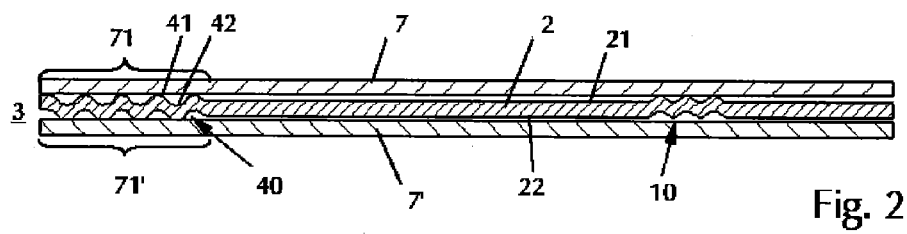
FIG. 2 is a schematic cross section along the line A-A in FIG. 1.
Figure 4:
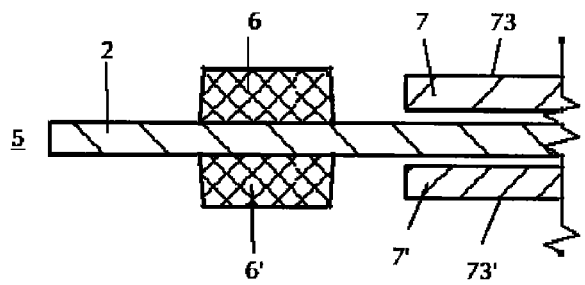
FIG. 4 is a schematic partial cross section along the line C-C in FIG. 1.
Figure 3:
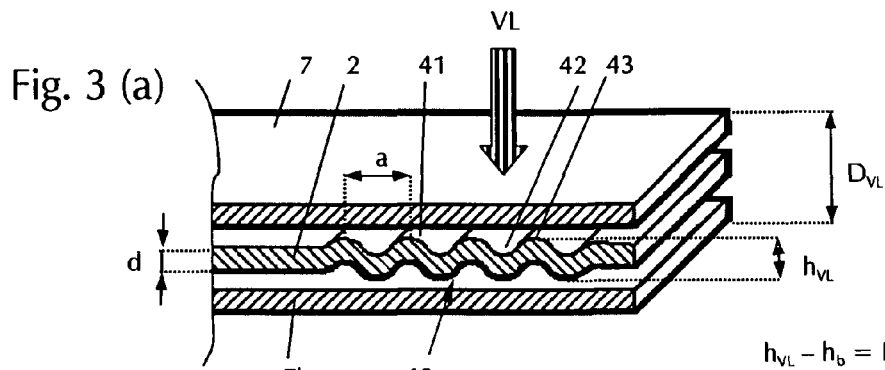
FIGS. 3(*a*) and 3(*b*) are schematic partial cross sections along the line B-B in FIG. 1 to illustrate the determination of the value of the protrusion at the edge of the combustion chamber.
Figure 3:
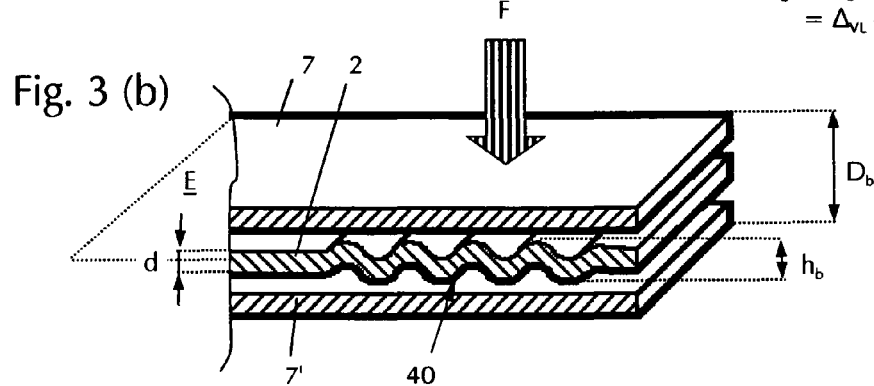

A further support element is located in the region parallel to the narrow rims of the gasket as can be seen in detail in FIG. 2. This support element 10 extends substantially parallel to the edge region of the gasket (in this case only the right-hand sealing element is shown in the region next to the right-hand combustion chamber opening 3). The support element 10 serves in a manner known per se to prevent distortions between the motor block and cylinder head in this region. The support element 10 is in this case likewise configured in the form of an undulatory profiling. The wave crests and wave troughs are however configured lower than in the region of the undulatory profilings 40 around the combustion chamber openings 3. In addition, fewer wave crests and wave troughs are present. It is not specified in the sectional view shown in FIG. 2 whether the undulatory profiling parallel to the narrow rim consists merely of the mutually parallel elevations and depressions which can be seen in section or whether these elevations and depressions are intersected by at least one further set of parallel elevations and depressions, thus producing a more complex embossed structure.

The gasket layer 2, which contains the annular profilings 40, is divided into a plurality of segments, of which the segment 23 can be seen in full, the segment 24 only partially in FIG. 1. The segments each comprise two combustion chamber openings, so a plurality of segments can be combined to form cylinder head gaskets with 4, 6 or more combustion chamber openings. The border region, in which the segments 23 and 24 meet, is indicated by broken lines and marked with the letter G. In contrast to the segments of the gasket layer 2, the covering metal sheets 7 and 7' are formed in one piece over the entire extent of the cylinder head gasket, so they also cover the border region G. The covering metal sheets 7 and 7' have no sealing or support elements and are configured so as to be completely planar. The surface area of the cover layer 7 is indicated in FIG. 1 by hatching. The second cover layer 7', which cannot be seen in FIG. 1, is configured so as to correspond to the cover layer 7.

Figure 5:
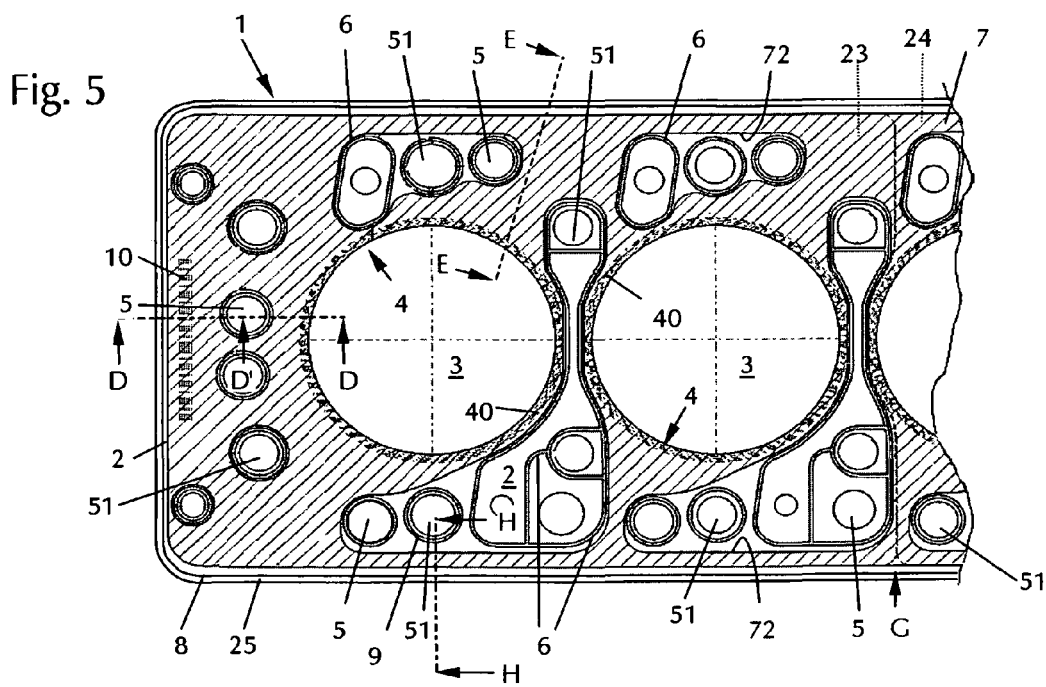
FIG. 5 is a schematic partial plan view onto a further example of a metallic flat gasket based on the example of a cylinder head gasket.

FIG. 5 is a partial plan view of a further example of a cylinder head gasket according to the invention. This cylinder head gasket corresponds substantially to that of FIG. 1, although it differs in terms of the arrangement of the further through-openings 5, i.e. the water and oil openings. In addition, the covering metal sheets 7 and 7' do not extend to the outer edge of the gasket layer 2, but rather leave the outer edge region 25 of the gasket layer 2 free. The reason for this is that a sealing lip 8 made of elastomer material encircles along the outer edge of the gasket layer 2. FIG. 5 is in this case, for the sake of simplicity, intended to include a plurality of embodiments of the sealing lip 8. Like the elastomer lip 6, the sealing lips 8 have a width of at least 0.5 mm.

Figure 6:
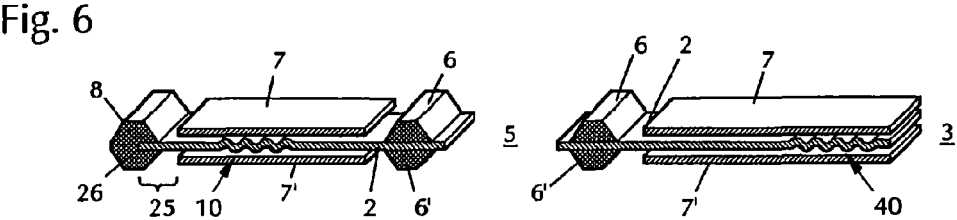
FIG. 6 is a schematic cross section along the line D-D of FIG. 5.

In the example of FIG. 6, the outer edge sealing lip 8 is molded onto the outer rim 26 of the gasket layer 2. The sealing lip 8 protrudes not only outward, but rather also beyond both surfaces of the gasket layer 2 beyond the surfaces of the covering metal sheets 7 and 7 and thus provides a sealing line at the outer edge of the gasket. FIG. 6 is a cross section along the line D-D of FIG. 5 in a region from the outer edge of the gasket up to a combustion chamber opening 3. The combustion chamber opening 3 is again surrounded by an undulatory profiling 40. The through-opening 5 in the "hinterland" of the gasket on the other hand, for example a through-opening for cooling water, is sealed by sealing elements made of an elastomer which is applied in the form of sealing lips 6 and 6' on both surfaces of the gasket layer 2 and protrudes beyond the surfaces of the covering metal sheets 7 and 7', such as was previously described in conjunction with FIG. 4. On the narrow side of the gasket there extends, again, a "hinterland" support element 10 corresponding to that of FIG. 2.

Figure 7:
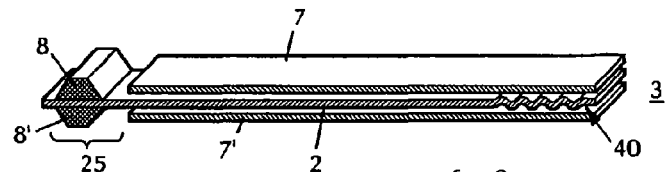
FIG. 7 is a schematic cross section along the line E-E of FIG. 5.

FIG. 7 is a partial cross section along the line E-E of FIG. 5. The sealing of the combustion chamber openings corresponds to that of the preceding figures. The outer edge seal is, in contrast to FIG. 6, not edge molded onto the outer rim 26 of the gasket layer 2 but rather applied in the edge region 25 on both sides of the gasket layer 2 as a sealing lip 8 or 8'.

Figure 8:
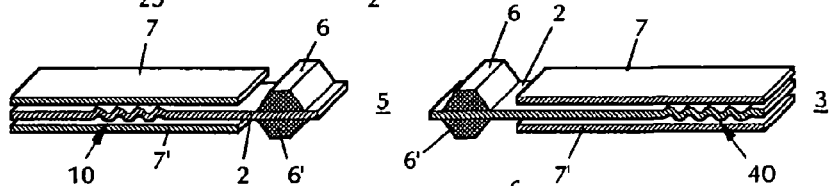
FIGS. 8 to 10 show schematically various variations of the configuration of the gasket in partial cross section along the line D-D in FIG. 5.

FIG. 8 shows a variation of the configuration of the region shown in FIG. 6. In this case, no outer edge sealing lip is provided; instead, the covering metal sheets 7 and 7' reach up to the outer edge of the gasket layer 2. As far as the configuration of the outer edge of the gasket layers is concerned, this cross section therefore corresponds more closely to that of FIG. 1 than to that of FIG. 5.

Figure 9:
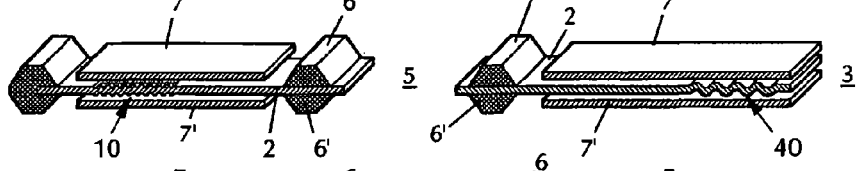
Figure 10:
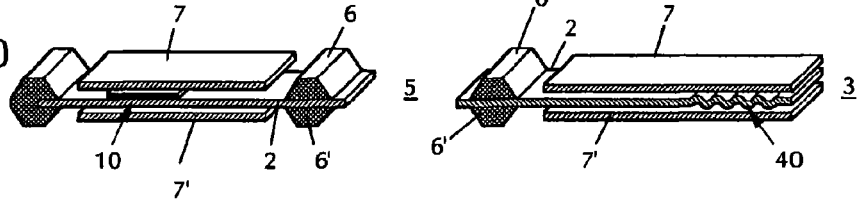

FIGS. 9 and 10 show alternatives of the "hinterland" support 10. Instead of the undulatory profiling illustrated in FIGS. 2 and 6, the "hinterland" support 10 in the embodiment according to FIG. 9 consists of a surface structuring of the surfaces 21 and 22 of the gasket layer 2. This surface structuring, which is expediently likewise generated by embossing, consists for example of elevations which are arranged in the manner of a chessboard and separated by depressions. In FIG. 10 the "hinterland" support used is a strip-like rest. Preferably, the rest is a metallic rest, which was fastened to the gasket layer 2 by either welding or a similar process, or what is known as a hard coating, i.e. a coating made of material having low compressibility.

Figure 11:
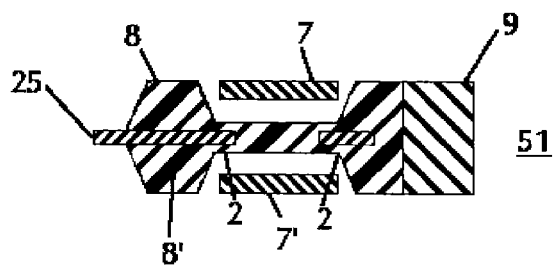
FIG. 11 is a schematic partial cross section along the line H-H in FIG. 5.

FIG. 11 is a partial cross section along the outer edge region of the gasket illustrated in FIG. 5, namely along the line H-H. Present in this case along the outer edge of the gasket layer 2 is likewise an edge molded elastomer which forms elastomer sealing lips 8, 8' encircling the outer edge region 25. In the example shown, the covering metal sheets 7 and 7' are not brought up to the outer edge of the gasket layer 2, but rather are at a relatively large distance therefrom (see also FIG. 5). The covering metal sheets 7 and 7' can therefore not act as a compression protection means for the sealing lip 8. In order nevertheless to prevent excessive compression of the sealing lip 8, 8', a plurality of local support elements 9 are introduced into the gasket layer 2 in the vicinity of the sealing lips 8, 8'. The support elements 9 are specifically metal sleeves which have a greater thickness than the thickness of the gasket layer 2 and protrude beyond the gasket layer 2 on both sides. The metal sleeves 9 are each inserted into the screw openings 51 which are located in the vicinity of the outer edge of the gasket layer 2. Owing to the fact that the thickness of the sleeves 9 is greater than the thickness of the gasket layer 2, the sleeves act as a compression protection means for the elastomer lips 8, 8' at the sealing edge.

Figure 12:
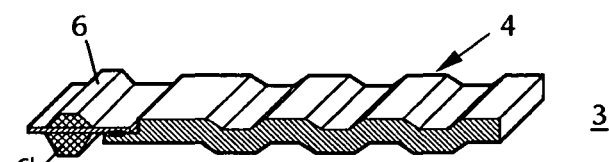
FIGS. 12 to 14 are schematic cross sections along the line D-D' of FIG. 5, FIGS. 12 and 14 illustrating examples from the prior art.
Figure 13:
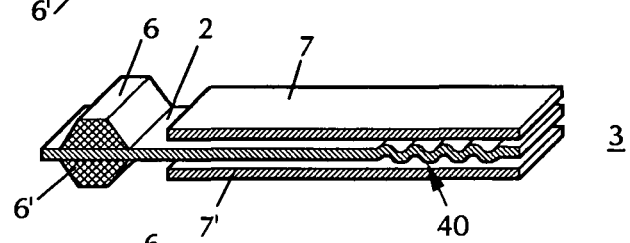
Figure 14:
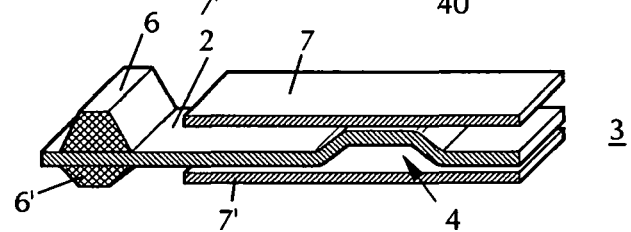

FIGS. 12 to 14 serve to compare the flat gasket according to the invention and in this case specifically the sealing of the combustion chamber openings 3 with the designs previously conventional in the prior art. FIG. 13 is a partial cross-sectional view of the example according to the invention. The figure corresponds substantially to the right-hand region of FIG. 6. FIGS. 12 and 14 show the same detail, but with differing sealing elements for the combustion chamber opening 3. In FIG. 12 the combustion chamber opening 3 is sealed by a plastically deformable multiple bead as the sealing element 4. An insert with elastomer beads 6, 6' is connected to this multiple bead, the insert being welded on. The thickness of the multiple bead as the sealing element 4 is very large, so the introduced multiple bead has predominantly plastic but only minimal elastic properties. The gasket according to FIG. 14 has, on the other hand, a purely elastic bead as the sealing element 4. Without a stopper, this elastic bead can however become completely flattened during operation of the gasket. A concentration of force on the combustion chamber is not possible without additional measures.

Figure 15:
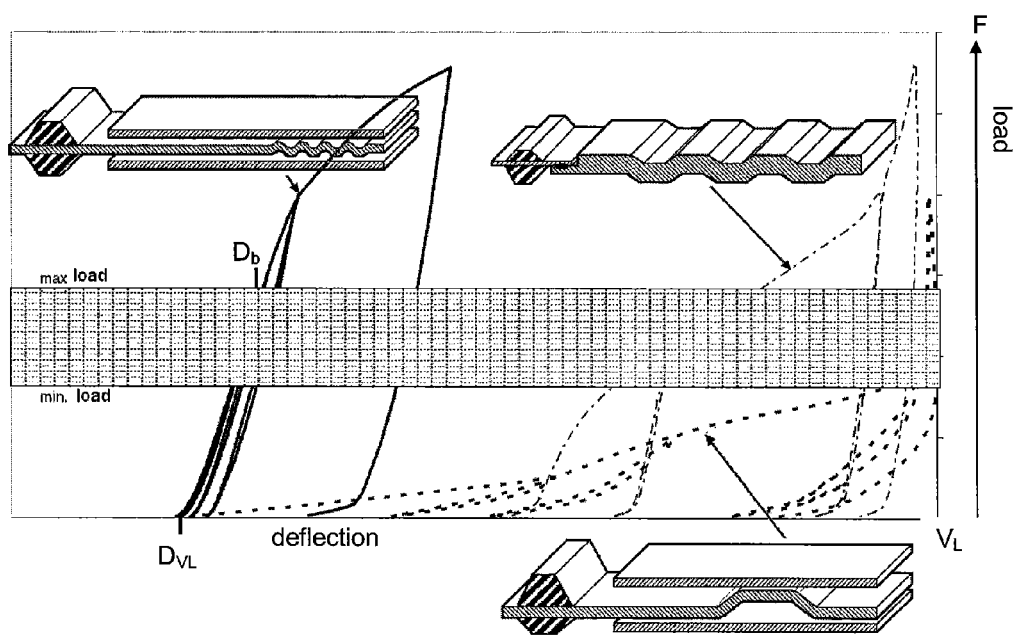
FIG. 15 shows schematically load deflection curves of the sealing elements of the gaskets according to the examples in FIGS. 12 to 14.

FIG. 15 shows load deflection curves for the sealing elements illustrated in FIGS. 12 to 14. The deformation of the sealing element is plotted against the loading. The hatched bar illustrates the minimum and maximum loads which are to be expected during operation of the gaskets in a specific engine, i.e. the actual working range of the respective sealing elements during operation of the gasket. The plastic bead of FIG. 12 has higher rigidity, although the deflection capacity is low. Conversely, the undulatory profiling, as the sealing element in the gasket according to the invention shown in FIG. 13, displays both elastic and rigid behavior. It displays high rigidity but also good deflection properties and highly constant and good sealing behavior throughout the typical working range.

Figure 16:
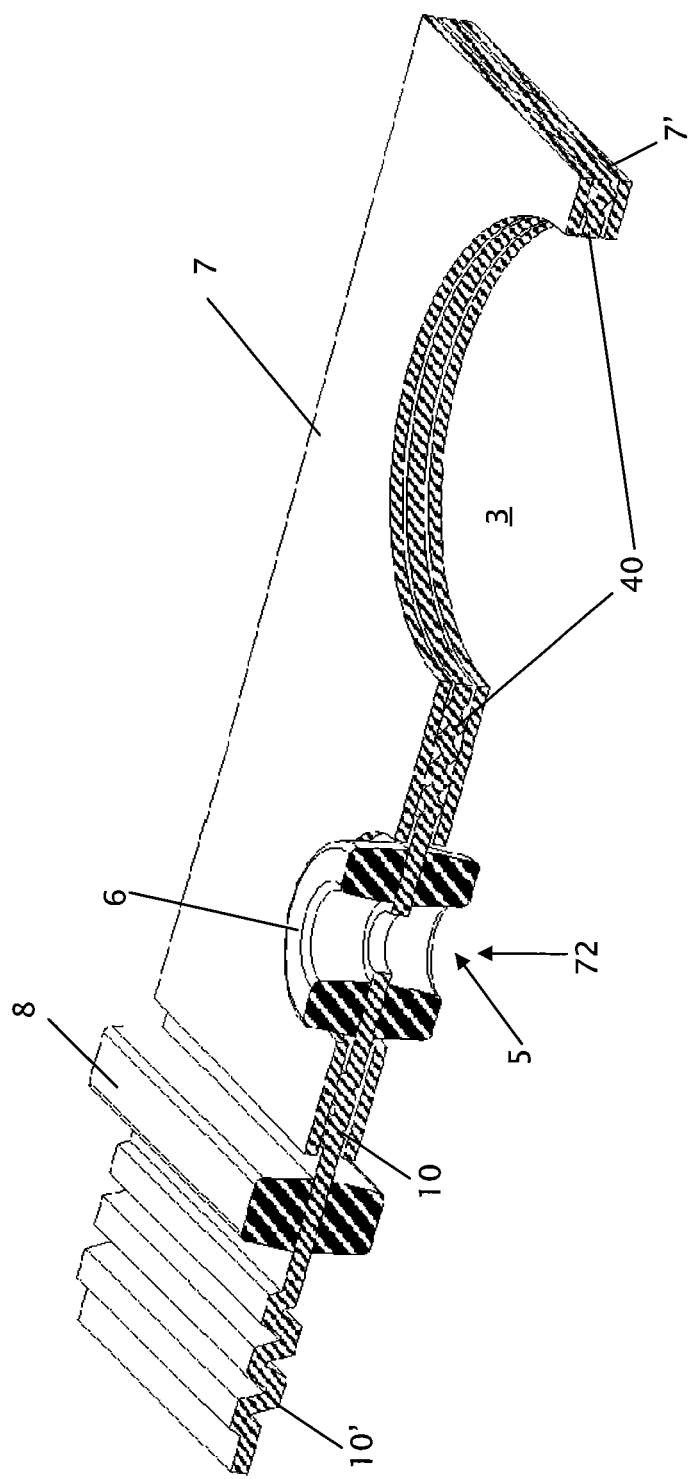
FIG. 16 is a schematic partial cross section of a further embodiment.
Figure 17:
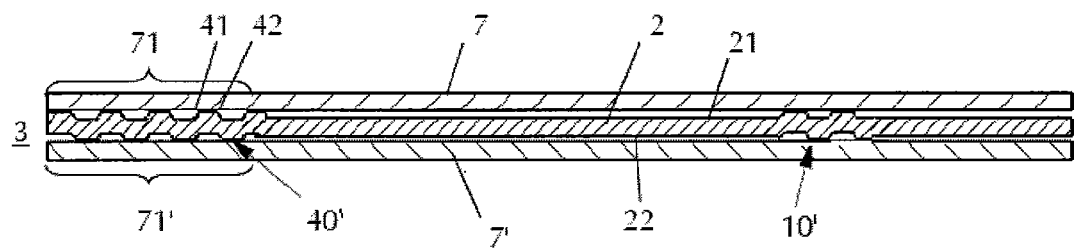
FIG. 17 is a schematic cross section of an alternative embodiment along line A-A of FIG. 1.
Figure 18:
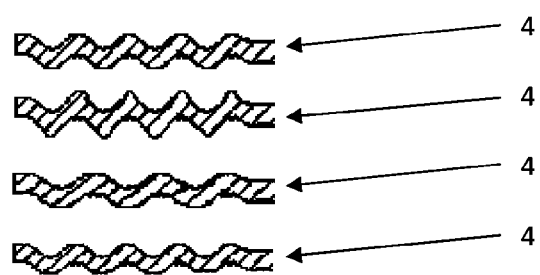
FIG. 18 schematically depicts partial sealing elements with varying wave crest height, varying cross-sectional shapes, varying distances between wave lengths and varying material thicknesses compared to one another.
Figure 19:
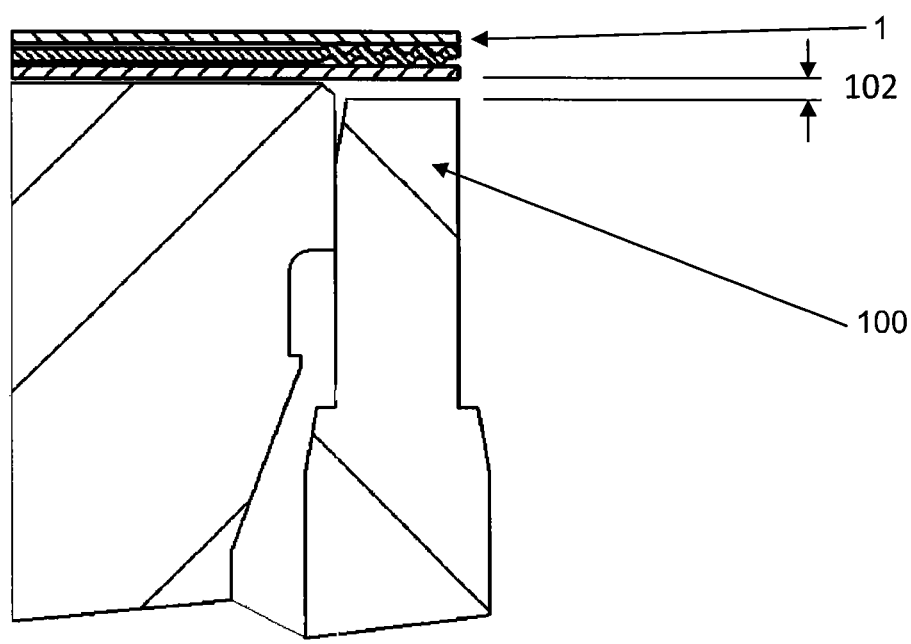
FIG. 19 schematically depicts a liner set off from an engine block.

FIG. 16 illustrates an embodiment with shortened cover layers 7, 7', in which the combustion chamber through-opening 3 is substantially concentrically surrounded by an undulatory profiling 40. Located in the "hinterland" of the gasket is a further through-opening 5, more precisely a fluid opening, which extends through all gasket layers and is sealed by an elastomer sealing element 6 which is molded-on annularly onto the gasket layer 2. Accordingly, the cut out portion is larger in the cover layers 7, 7' than in the gasket layer 2. Parallel to the outer edge of the gasket, outside the outer rim of the cover layers 7, 7', there extends a further elastomer sealing element 8 which, again, is molded-on onto the gasket layer 2. In both cases the sealing elements 6, 8 protrude beyond the cover layers 7, 7', so the cover layers 7, 7' can act as a deformation limiter for the elastomer sealing elements 6 and 8. Outside the sealing element 8 extending parallel to the outer rim, the covering metal sheets 7, 7' are cut out. In order nevertheless to arrive at a constant thickness of the gasket, the gasket layer 2, in which the undulatory profiling 40 is configured, is provided in this region with a further profiling 10' consisting of straight elevations and depressions extending parallel to one another.

The invention claimed is:

1. A metallic flat gasket, comprising:
at least one gasket layer having two surfaces and having at least one combustion chamber through-opening which is surrounded by an elastically deformable sealing element which is configured in the form of an undulatory profiling in the gasket layer in such a way that on each of said two surfaces of the gasket layer at least two wave crests and two wave troughs are present, annularly surrounding the combustion chamber through-opening, an unloaded state thickness of the gasket layer in the region of the sealing element being greater than the original thickness of the gasket layer, wherein, apart from the undulatory profiling, no further sealing or support elements circumscribe the combustion chamber through-opening in said gasket and wherein the sealing element has, when subjected to linear compression of from 500 to 2,800 N/mm in a direction which is substantially perpendicular to a plane of the gasket layer, a linear compression thickness which is from 0.05 to 0.3 mm greater than the original thickness of the gasket layer, the gasket layer having at least 4 through-openings for fastening means and also at least one further through-opening for lubricant or coolant that is surrounded by an elastomer sealing element, and the combustion chamber through-opening having a diameter of less than 200 mm.

2. The metallic flat gasket according to claim 1, wherein the undulatory profiling has a sinusoidal, or trapezoidal cross-sectional profile.

3. The metallic flat gasket according to claim 1, wherein the undulatory profiling is variably configured in a radial and/or circumferential direction around the combustion chamber through-opening, in particular with respect to at least one of the following properties:
   height of the wave crests,
   cross-sectional shape of the wave crests and/or wave troughs,
   distance between adjacent wave crests, and
   material thickness in the region of the wave crests and/or wave troughs.

4. The metallic flat gasket according to claim 1, wherein a wave length between peak points of adjacent wave crests is in a range of up to 2.0 mm.

5. The metallic flat gasket according to claim 1, wherein said original thickness of the gasket layer is from 0.3 to 0.6 mm.

6. The metallic flat gasket according to claim 1, wherein said gasket has a plurality of combustion chamber through-openings which are each separated by a web having a width of at least 4 mm.

7. The metallic flat gasket according to claim 1, wherein the gasket layer is made of a metal selected from the group of carbon steel, stainless steel and spring steel, having a tensile strength of at least 600 N/mm$^2$.

8. The metallic flat gasket according to claim 1, wherein said undulatory profiling is divided into at least two segments which meet in a region between two adjacent combustion chamber through-openings each with undulatory profilings.

9. The metallic flat gasket according to claim 1, wherein the sealing element has, when subjected to linear compression of from 800-2,500 N/mm in a direction which is substantially perpendicular to the plane of the gasket layer, a sealing element thickness which is from 0.05 to 0.3 mm greater than the original thickness of the gasket layer.

10. The metallic flat gasket according to claim 1, wherein the gasket comprises, apart from the gasket layer, no further gasket layers.

11. The metallic flat gasket according to claim 1, wherein said gasket has at least one cover layer which rests against one of said two surfaces of the gasket layer and thus covers the region of the undulatory profilings.

12. The metallic flat gasket according to claim 11, wherein the at least one cover layer has a planar portion in the region opposing the undulatory profilings.

13. The metallic flat gasket according to claim 11, wherein the at least one cover layer has, in the region around the at least one further through-opening in the gasket layer, a cut out portion in such a way that the elastomer sealing element surrounding the further through-opening is received in the cut out portion.

14. The metallic flat gasket according to claim 13, wherein the elastomer sealing element is configured to be sufficiently tall that in the non-installed state it protrudes beyond a surface of the at least one cover layer that is remote from the gasket layer.

15. The metallic flat gasket according to claim 11, wherein the at least one cover layer covers a region in which adjacent segments of the gasket layer meet.

16. The metallic flat gasket according to claim 11, wherein the at least one cover layer exposes a region of the outer edge of the gasket layer at least in certain portions.

17. The metallic flat gasket according to claim 1, wherein an elastomer sealing lip protruding beyond said two surfaces of the gasket layer extends, at least in certain portions, along an outer edge of the gasket layer.

18. The metallic flat gasket according to claim 17, wherein the elastomer sealing element and/or the sealing lip is made of elastomer having a hardness of at least 35 Shore A.

19. The metallic flat gasket according to claim 18, wherein said gasket contains at least one local support element.

20. The metallic flat gasket according to claim 19, wherein the gasket layer has, adjacent to the sealing lip, said at least one local support element which protrudes beyond at least one of said two surfaces of the gasket layer at a height which is less than the projection of the sealing lip beyond at least one of said gasket layer surfaces.

21. The metallic flat gasket according to claim 20, wherein the support element is inserted, as a sleeve, into a further through-opening, in particular into a screw opening.

22. The metallic flat gasket according to claim 17, wherein the elastomer sealing element and/or the sealing lip has a width of at least 0.5 mm.

23. The metallic flat gasket according to claim 17, wherein the sealing lip is arranged so as to project beyond the outer edge of the gasket layer.

24. The metallic flat gasket according to claim 1, namely a cylinder head gasket having a longitudinal direction and a transverse direction with an extent in the longitudinal direction of up to 1,500 mm and in the transverse direction of up to 500 mm.

25. The metallic flat gasket according to claim 1, wherein said gasket is installed between a cylinder head and a motor block in an engine without a liner or with liners having a liner projection or setoff of at most 0.15 mm.

26. The metallic flat gasket according to claim 1, wherein said gasket is installed between a cylinder head and a motor block in an engine with an ignition pressure of at least 140 bar.

27. The metallic flat gasket according to claim 1, wherein the gasket layer is made of metal, in particular carbon steel, stainless steel or spring steel, having a tensile strength of at least 1,000 N/mm².

\* \* \* \* \*

UNITED STATES PATENT AND TRADEMARK OFFICE
CERTIFICATE OF CORRECTION

PATENT NO. : 8,496,253 B2  Page 1 of 1
APPLICATION NO. : 12/451026
DATED : July 30, 2013
INVENTOR(S) : Goettler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this
Fifteenth Day of September, 2015

Michelle K. Lee
*Director of the United States Patent and Trademark Office*